J. C. HAWLEY.
TOOL AND METHOD USED IN MAKING SHELLS.
APPLICATION FILED MAY 21, 1917.
1,286,309.
Patented Dec. 3, 1918.
2 SHEETS—SHEET 1.
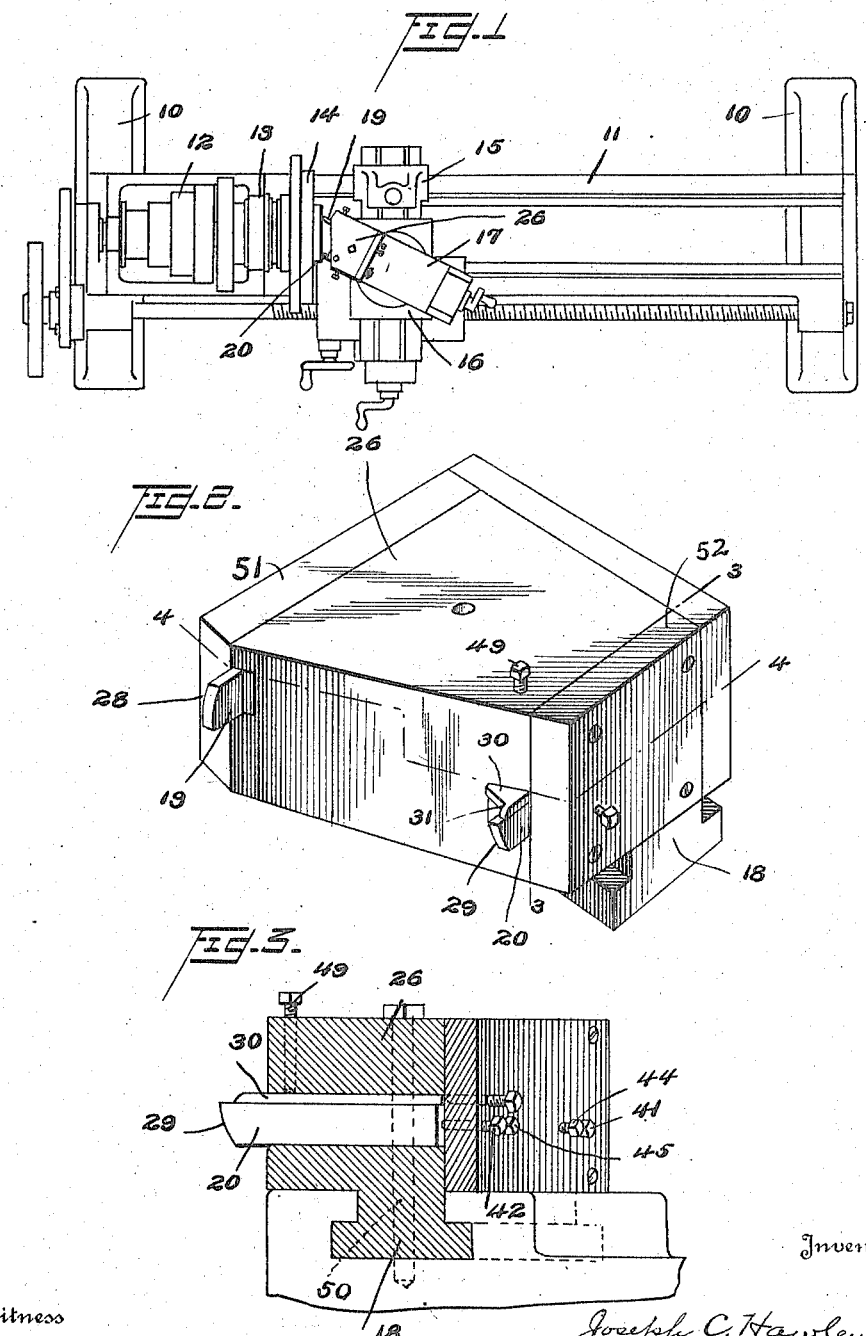

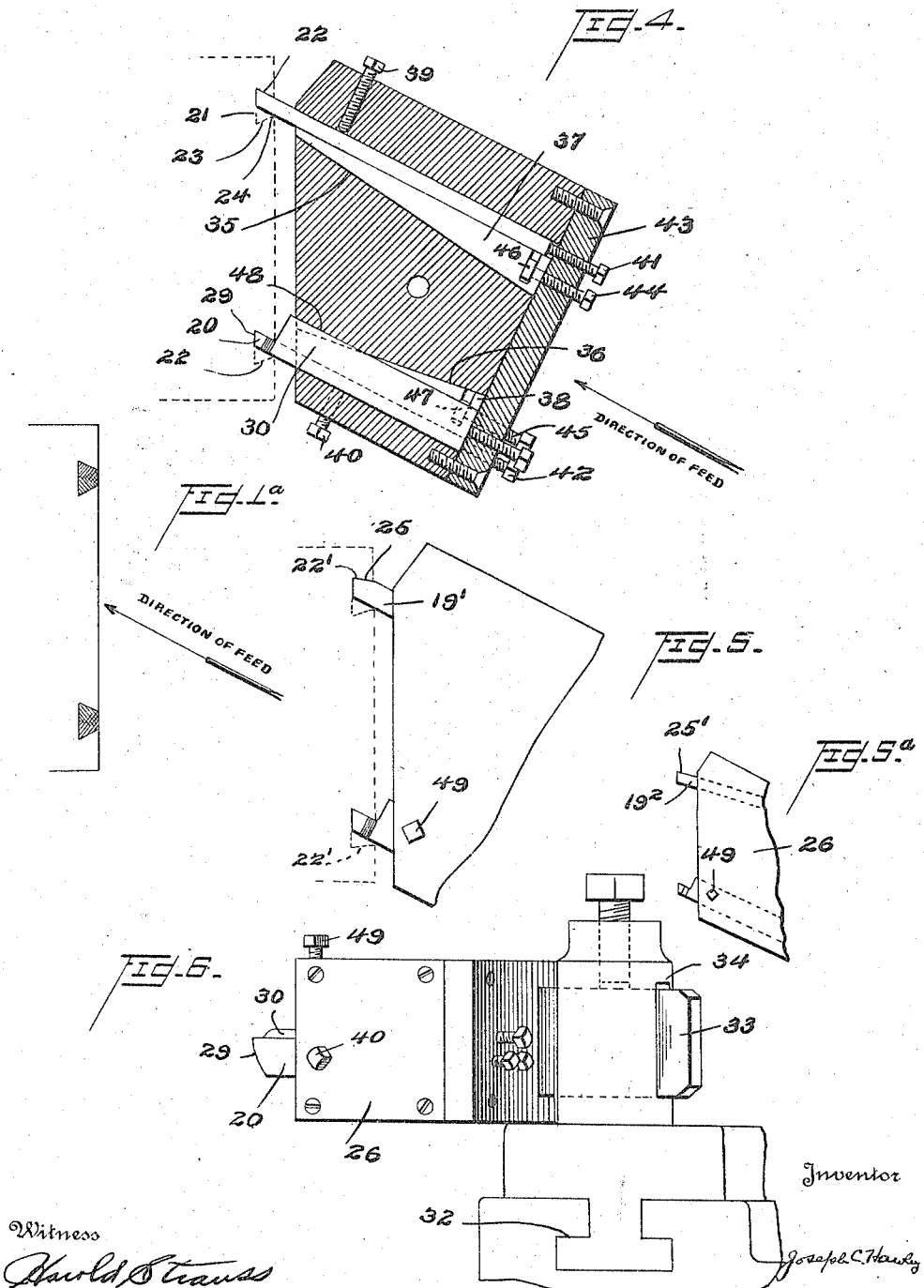

UNITED STATES PATENT OFFICE.

JOSEPH C. HAWLEY, OF DUNCANNON, PENNSYLVANIA.

TOOL AND METHOD USED IN MAKING SHELLS.

1,286,309.　　　　　　　Specification of Letters Patent.　　　Patented Dec. 3, 1918.

Application filed May 21, 1917. Serial No. 169,889.

*To all whom it may concern:*

Be it known that I, JOSEPH C. HAWLEY, a citizen of the United States, residing at Duncannon, in the county of Perry and State of Pennsylvania, have invented a certain new and useful Tool and Method Used in Making Shells, of which the following is a specification.

My invention relates to methods and constructions cutting on opposite sides of the center of a rotating work holder to facilitate the completion of an annular groove by performing the same or nearly the same operation by each of two tools at the same time.

The main purpose is to cut a dovetailed groove in the base or rear end of a projectile shell at a single operation.

A further purpose is to form an annular dovetailed groove in the rear end of a shell by feed at an angle to the shell axis and lengthwise of the tools, using two tools upon opposite sides of the center and cutting upon the ends of the tools, completing the grooving by this angular feed, either by the end cutting alone or by the use of a supplemental tool face upon one of the tools.

A further purpose is to cut both the bottom and the sides of a dovetailed annular groove in the rear end of a shell or other work, by moving two cutting tools wholly in a direction at an angle to the center line of the lathe or other machine used.

A further purpose is to separate the tools for cutting the dovetail from the cutter for giving curvature to the inner sides of the outer edge of the dovetail.

A further purpose is to control the position of tools having to be set relatively to each other by positive means, operating longitudinally and laterally with respect thereto.

A further purpose is to practise the processes set out in this application.

Further purposes are set forth in the specification and in the claims hereof.

I have preferred to illustrate my invention by but two general forms thereof, suited to equal and different angles of inclination of the sides of the dovetailed groove, respectively, selecting forms which are practical, highly efficient and inexpensive and which at the same time well illustrate the principles of my invention.

Figure 1 is a top plan view showing a conventional lathe with one of my tools in operative position therein, Fig. 1ª is a diagrammatic view showing the lines of tool cut.

Fig. 2 is a perspective view of one embodiment of my invention.

Fig. 3 is a section of Fig. 2 upon lines 3—3 thereof.

Fig. 4 is a section of Fig. 2 upon lines 4—4 thereof, the work being dotted in position.

Fig. 5 is a broken top elevation of a tool similar to Fig. 2, but showing a modification.

Fig. 5ª is a corresponding view, showing a further modification.

Fig. 6 is a side elevation showing the adaptation of my tool to use in an ordinary tool post.

In the drawings similar numerals indicate corresponding parts.

In cutting the grooves in the rear of shells, it has been customary to use tools on opposite sides of the center of the lathe or chuck in which the shell is held, one tool having its cutting edge facing upwardly and the other with its cutting edge facing downwardly. The front cutting edges of the tools have been substantially at right angles to the direction of initial tool feed, and they have been fed in a direction parallel to the line of lathe centers to cut the middle part of the annular dovetailed groove clear to the bottom of the channel and, subsequently, for the undercutting, the same tools have been fed transversely to the line joining the lathe centers, the cutting then taking place along a side cutting face within a relatively recessed or reëntrant part of each of the tools. One edge of the dovetailed groove has been rounded by the turn of this reëntrant angle, requiring careful grinding of this recessed portion to the required curvature in accurate relation to the side cutting face.

The objections to this process and the mechanism used to carry it out have been three-fold. In the first place, it has required two directions of tool feed; first parallel to and then at right angles to the line of lathe centers. In the second place, as practised, it has required the grinding of a reëntrant side cutting face upon each tool, terminating in the one tool in an accurate arc at the corner of the reëntrant angle, giving difficulty both in the initial formation of the tool and in the grinding of the tool. In the third place, injury to the point of the tool has required reforging of the tool with practical reconstruction of the cutting face.

My invention involves one direction of feed only. When applied to a dovetailed annular face groove having equal angles of taper or slope on the two sides of the dovetail, involves cutting upon the front edge of the tool alone for the formation of the dovetailed groove, the slight breaking of one edge at the outer dovetail limit to give the curvature mentioned being accomplished by a separate tool. Where the sides of the dovetail extend at different angles, my invention still requires but one direction of tool feed but utilizes a side face of one of the cutting tools. This side face may be relatively projecting as distinguished from a side face forming part of a reëntrant angle. In such case the side-face cutting is preferably upon one side face only, that in which the side of the dovetail is most nearly perpendicular to the bottom of the groove. In both cases my invention cuts the complete groove by feeding in one direction only, and this direction may be parallel to one side of the dovetail groove or, by using two side cutting faces, in a direction at a greater angle thereto with respect to the lathe center line.

In Fig. 1 the lathe frame is shown at 10, as having a bed 11, cone driving pulley 12, head bearing 13 and chuck 14, in which the shell or other work is held. The character of lathe used does not affect my invention.

The carriage 15 supports transverse slide 16. As one mechanism by which my device may be supported and fed I show a conventional compound rest 17. I have shown one embodiment of my device as secured by tongue 18 and any suitable holding mechanism, in a groove across the end of this compound rest. My device is, of course, capable of being assembled in any one of many ways, so as to present the two cutting tools 19 and 20 in proper relation for the work, and the frame, shown for example in Fig. 2, is intended for convenient presentation of the actual cutting tools, so as to provide for their proper spacing, ready adjustment and rigid support from tool post, compound rest, turret or other machine part, as may be desired; my invention not being directed to the manner of holding the device or implement, nor the manner of supporting the cutting tools therein, so much as to the presentation of tools in the relation indicated and their progression in a single direction to complete the cutting of the dovetailed annular face groove indicated.

One form of groove to be cut is represented at 21, in Fig. 4, where the extent of taper or slope of the sides 22 and 23 is the same, though in opposite directions, and where the boundary of the groove at the inner edge of the outside face at 24 is intended to be slightly curved to avoid a sharp edge at this point.

In this form, the direction of feed of the cutting tool (the setting of the compound rest) is preferably parallel to the direction of one of these surfaces 22 or 23 i. e., parallel to the elemental lines of such surface adjacent the cutting tool; though it will be obvious that projecting side cutting faces, such as shown at 25, in Fig. 5, could be used with both of the cutting tools to permit a greater angle of feed while still obtaining part of the benefit of my invention.

In any event, the angle of the feed of the cutting tool with respect to the line between the lathe centers, is preferably at least as great as that of the taper or slope of either of the sides 22 and 23 of the dovetailed annular face groove.

In the form shown in Fig. 1, any suitable frame or support 26 is intended to carry the two cutting tools 19 and 20 having their end cutting faces 28 and 29 at such an angle to the direction of feed of the body upon which the two tools are supported as that the end face shall finish the bottom of the channel to the required shape, normally in a plane perpendicular to the lathe center line. I prefer to place the lengths of the tools parallel to their direction of feed.

With the two side surfaces 22 and 23 of equal taper with respect to the lathe center line, the cutting edge of tool 20 facing upwardly and that of 19 facing downwardly, and the combined faces of 28 and 29 having a breadth equal to the width of the bottom 21 of the groove, which may be divided between them in any proportion desired and permitted by the width of groove opening, it will be seen that feed of the two tools simultaneously parallel with the outside of the groove 22 at the one side of the lathe (and correspondingly parallel with the inside edge 23 of the groove at the opposite side of the lathe) will result in the groove being cut wholly by the front cutting faces 28 and 29 of the two tools, the side faces of the tools having, in this case, no need of cutting function since the front cutting faces of the tools operate to cut the metal out of the grooves into different corners thereof, as best indicated by the enlarged broken section, Fig. 1ª in which the portions cut by the two tools are differently cross sectioned. It will be seen that the portion of the groove which is cross sectioned in both directions will lie within the line of cutting movement of both of the tools.

I prefer to place the cutting edges of the two tools in substantially transverse line with the line of lathe center giving them height equal to that of the center.

In order to avoid complication of the main cutting tools to provide for breaking the edge 24 to the curvature desired, I cut this curvature by a separate tool 30 which can be replaced as often as required and whose curved cutting surface 31 can be reground and reset without requiring renewal of the coöperating tool 20.

Where it is desired to feed the tools 19 and 20 at an angle in excess of the angle of slope or taper of the edges 22 or 23 of the dovetailed groove, for any reason, or where one of these edges of the groove has a smaller angle of slope or taper with reference to the lathe center line than the other, as in Fig. 5, requiring a smaller angle when finished than the minimum angle of feed dictated by the other edge, as where the slope or taper of the angle at 22′ is to be less than the slope of the angle at 23, I finish one side face of each of the tools or, in the latter case, of one of the tools 19′ with a projecting (as opposed to reëntrant) side cutting face 25, in order that the difference in taper between the angle of feed and the sides or side of the dovetailed channel wall may be taken off by this side cutting face 25. In Fig. 5ᵃ the same result is attained by turning tool 19² at such an angle that the side cutting edge 25′ is parallel with the tool side. Of course the front cutting edge must be ground to parallel the bottom of the groove.

Even where a side cutting face is used, with my angular feed the grinding of the tool or tools does not present the problem presented by the existing tools nor require substantial reconstruction when the point is broken or dulled and I obtain the advantage of being able to feed my tools in but one direction to finish the groove.

In operation, taking the form shown in Figs. 1 and 2, my tools, however supported, are fed in the direction of the line of side wall 22 of the dovetail groove until the bottom of the channel has been reached, at which time the entire material of the channel has been cut away with this single direction of tool feed and without any side cutting by either tool, except as the curvature of the inner edge is given by the additional tool 31.

The form shown in Fig. 5, is operated in precisely the same way, but does effect side cutting by the surface 25 upon tool 19 to the extent that the two side walls of the dovetail annular face groove differ in taper. This also feeds in the direction or substantially in the direction of channel wall slope. This is also preferably in the direction of tool length, to get the best results in stiffening of the tool.

Where the bottom of the groove to be cut is wider than twice the width of the desired front tool cutting face of a single tool, or where for any other reason the user prefers to feed the tools in two directions, successively, my angular direction of feed is advantageous for the initial feed in that a more desirable (projecting or less reëntrant) side cutting face may be secured, making these faces more easily accessible.

Having now described the broader principles of my invention, I will pass to more detailed discussion of means by which the tools may be supported and adjusted, pointing out, however, particularly, that these are details relatively, lying well within the province of the tool designer, in view of the disclosure made of my invention.

In the first place I recognize that my tool, however constructed, can be used with good results in a variety of different ways. It may be supported in any suitable manner upon a compound rest as in Fig. 1, utilizing the angular feed provided by this rest in ordinary lathes and fitting into a transverse groove, such as that shown at 32 in Fig. 6 for tool post support. Or it may be supported by means of a heel 33 from such a tool post 34. Obviously, the height of the tools with respect to their connection with the compound rest or other slide or tool post would be different for such different constructions.

The device may also be supported upon a turret lathe for use as one implement only in a series of implements intended to be used in turn upon the same work. In this case the manner of support and of angular feed would correspond to the character of turret.

In order to show one form of actual mounting of the cutting tools themselves, in accordance with the statutory requirement, I have illustrated that form which is best among those known to me, wherein the block 26, supported in one of the means suggested, as by tongue or heel 33 is provided with two tapered slots 35 and 36 for the tools 19 and 20 and for wedges 37 and 38. Tightening screws 39 and 40 give angular adjustment. The tools are driven forward by screws 41 and 42 resting in a rear plate 43, which is made removable for convenience. The screws 41 and 42 bear against the rear ends of the two tools to advance them positively and the wedges are operated by means of screws 44 and 45. These are provided with ends 46 and 47 coöperating with the wedges, so that the latter may be moved positively in either direction by rotation of these screws 44 and 45, thus tightening the tools 19 and 20 in their positions as set. The additional tool 30 fits in a straight slot 48 superimposed above the slot 36. The tool 30 is held in position by a vertically movable screw 49.

The mechanism described permits the tools to be quickly and accurately adjusted to space them properly and to advance them to the same extent relatively to the bottom 21 of the annular groove so that they will cut to the same depth and give the desired width and taper to the annular dovetailed groove.

It will be evident that my invention is applicable in the exact forms described to cut grooves of the character stated in any plane surfaces which are rotated in their planes and that the same principle precisely can be applied without substantial change to cutting annular dovetailed grooves or channels concentric with the axes of conical surfaces where the conical surfaces are rotated about the axes and with equal ease, whether the conical surfaces are dished or projecting.

The conventional set screw 50 for pressing against the bottom of the groove in the compound rest, as seen in Fig. 3, the removable sides 51 and 52 for my tool support, giving access to the slots for the tools and wedges and other details of construction are well within the province of the designer and have not been touched upon further because it is recognized that the variety of detail in such matters is very great.

I appreciate that part of the advantage of my invention may be obtained by the use of different angles of feed with corrections by side cutting faces differing in position according to the extent of correction in either tool to make the cut from it correspond to the intended taper of the groove side which it is cutting. The side cutting face, where used, is most desirably projecting, as in Fig. 5, but would still practice my invention even if parallel to the length of the tool, as in Fig. 5ª, or even reëntrant with respect thereto provided the feed be at an acute angle to the axis of work rotation, as this angularity of feed is effective to reduce the extent of reëntrance, even in such case.

Having thus described my invention, what I claim as new and desire to secure by Letters Patent is:—

1. In the art of cutting dovetailed grooves in rotating bodies presenting flat or tapered surfaces wherein two tools are used, cutting upon opposite sides of the axis of rotation and fed as a unit, the novelty which consists in providing two tools one on each side of the axis feeding these tools at an angle to the axis of rotation other than at right angles thereto.

2. The process as described in claim 1, in which the front face only of one at least of the tools is utilized for cutting purposes and the tool is advanced in the direction of the side of the groove adjacent this cutting tool.

3. The process as described in claim 2, in which any difference in extent of taper between the sides of the groove is corrected by utilizing a side face of one of the cutting tools at least, to cut that side of the groove having the less extent of taper.

4. The process of cutting dovetailed grooves in a body rotating about an axis, which consists in removing the material from the groove concurrently upon opposite sides of the axis of rotation by cuts advancing in a direction at an angle to the axis of rotation other than at right angles thereto.

5. The process of cutting dovetailed grooves in a body rotating about an axis, which consists in removing the material from the groove concurrently upon opposite sides of the axis of rotation by cuts having their bottoms parallel to the bottom of the groove and advanced at an angle to the bottom of the groove differing from a right angle.

6. The process of cutting dovetailed grooves in a body rotating about an axis, which consists in removing the material from the groove concurrently upon opposite sides of the axis of rotation by cuts parallel to the bottom of the groove advanced successively along a feed line parallel to the adjacent elements of one side of the groove.

7. The process of cutting dovetailed grooves in a body rotating about an axis, which consists in removing the material from the groove concurrently upon opposite sides of the axis of rotation by cuts parallel to the bottom of the groove advanced successively along a feed line parallel to the adjacent elements of one side of the groove and concurrently removing material from the other side of the groove by cuts parallel to said other side.

8. The process of cutting dovetailed grooves of differing side inclination in a body rotating about an axis, which consists in removing the material concurrently upon opposite sides of the axis of rotation by cuts on both sides parallel to the bottom of the groove advanced successively along the line of side groove elements adjacent to one set of cuts in the surface of greater inclination to the axis of rotation and at the same time by the other set of cuts removing material from the side of the groove parallel to the adjoining elements of the groove side of less inclination to the axis.

9. The process of cutting dovetailed grooves in a body rotating about an axis which consists in removing the material from the bottom and opposite sides of the groove concurrently upon opposite sides of the axis of rotation and advancing the cuts at an angle to said axis of rotation.

10. In a device for cutting annular dovetailed grooves about the axis of work rotation, a tool support, tools held thereby on opposite sides of the axis of rotation having cutting faces at an angle from the direction of feed less than a right angle and means for feeding the support at an acute angle to the axis of work rotation.

11. In a device for cutting annular dovetailed grooves about the axis of work rotation, a tool support, tools therein having front cutting faces placed parallel to the bottom of the intended groove and diagonal to the direction of tool feed and means for feeding the tool support parallel with one side of the intended groove adjacent one cutting tool.

12. In a device for cutting annular dovetailed grooves about the axis of work rotation, a tool support, tools therein having front cutting faces diagonal to the direction of tool feed, a side cutting face on one of the tools and means for feeding both tools parallel to the side of the groove adjacent the other cutting tool.

13. In a device for cutting annular dovetailed grooves about the axis of work rotation, a tool support, tools therein having front cutting faces diagonal to the direction of tool feed and side cutting faces at acute angles therewith and means for feeding the tools at an acute angle to the axis of work rotation.

14. In a device for cutting annular dovetailed grooves about the axis of work rotation, a tool support, tools therein having front cutting faces diagonal to the direction of tool feed and means for feeding the tools parallel to their length and with their cutting faces parallel to the intended groove bottom.

15. In a device for cutting annular dovetailed grooves about the axis of work rotation, a tool support, tools therein having front cutting faces diagonal to the direction of tool feed of combined width at least equal to the width of the intended channel bottom and placed parallel therewith in combination with means for feeding said tools parallel to the one side of said groove adjacent one of the cutting tools.

JOSEPH C. HAWLEY.

Copies of this patent may be obtained for five cents each, by addressing the "Commissioner of Patents, Washington, D. C."